United States Patent [19]

Voth et al.

[11] 4,301,647

[45] Nov. 24, 1981

[54] FORAGE CHOPPING CYLINDER

[75] Inventors: Harold W. Voth, Newton; John T. King, Hesston; Ronald K. Guinn, Wichita, all of Kans.

[73] Assignee: Hesston Corporation, Hesston, Kans.

[21] Appl. No.: 91,258

[22] Filed: Nov. 5, 1979

[51] Int. Cl.³ ............................................. A01D 49/00
[52] U.S. Cl. ....................................... 56/504; 56/249; 56/294
[58] Field of Search ................. 56/504, 505, DIG. 17, 56/249, 249.5, 250, 251, 252, 253, 254, 294; 241/222, 101.7

[56] References Cited

U.S. PATENT DOCUMENTS

| | | | |
|---|---|---|---|
| 2,476,177 | 7/1949 | Bloom et al. | 56/250 |
| 2,521,059 | 9/1950 | Goldberg | 56/249 |
| 3,126,931 | 3/1974 | Blanshine et al. | 241/222 |
| 3,974,970 | 8/1976 | Bertrand et al. | 241/222 |

FOREIGN PATENT DOCUMENTS 2852484  6/1979  Fed. Rep. of Germany ........ 56/504

*Primary Examiner*—Robert A. Hafer
*Attorney, Agent, or Firm*—Schmidt, Johnson, Hovey & Williams

[57] ABSTRACT

The chopping cylinder has knives that extend longitudinally of the axis of rotation of the cylinder and which are twisted in such a way that their longitudinal cutting edges wind generally helically around the periphery of the cylinder so that a scissor-like shearing cut is obtained as the knives move past a cooperating shearbar. Special crop flow directors are bolted to the inner faces of the knives between supporting spiders for the knives so as to intercept the crop flow headed toward the interior of the cylinder following severance and to maintain the same adjacent the outer periphery of the cylinder during the movement of the crop material around and with the cylinder to a point of discharge. Special mounting hardware permits the individual directors to be attached directly to the knives in a manner to increase the efficiency and performance of the cylinder.

13 Claims, 8 Drawing Figures

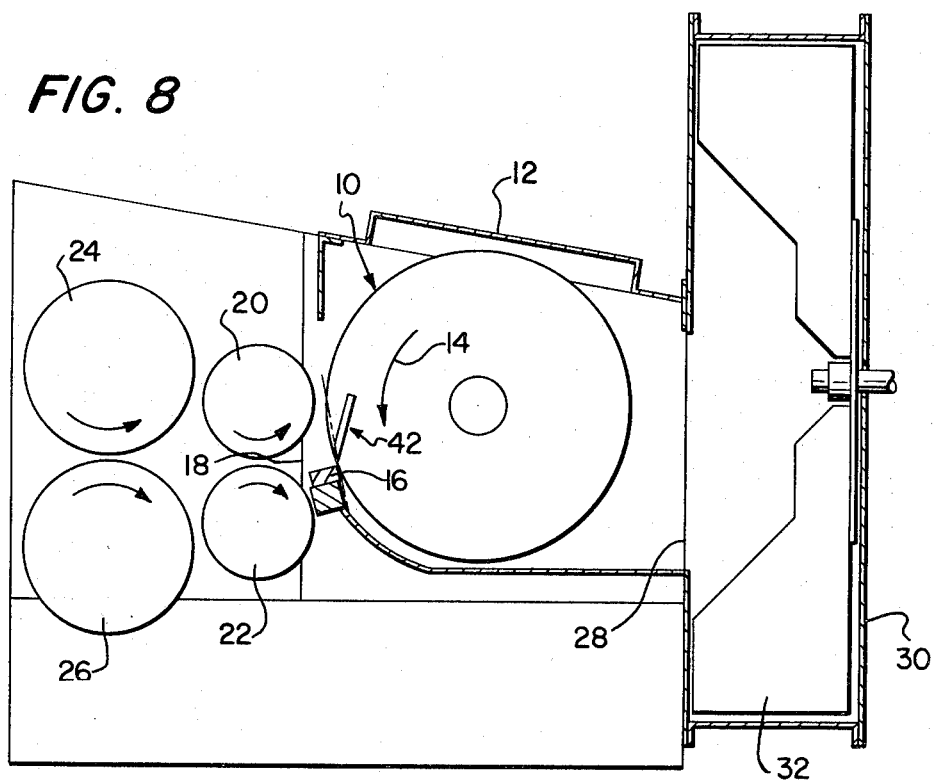
FIG. 8
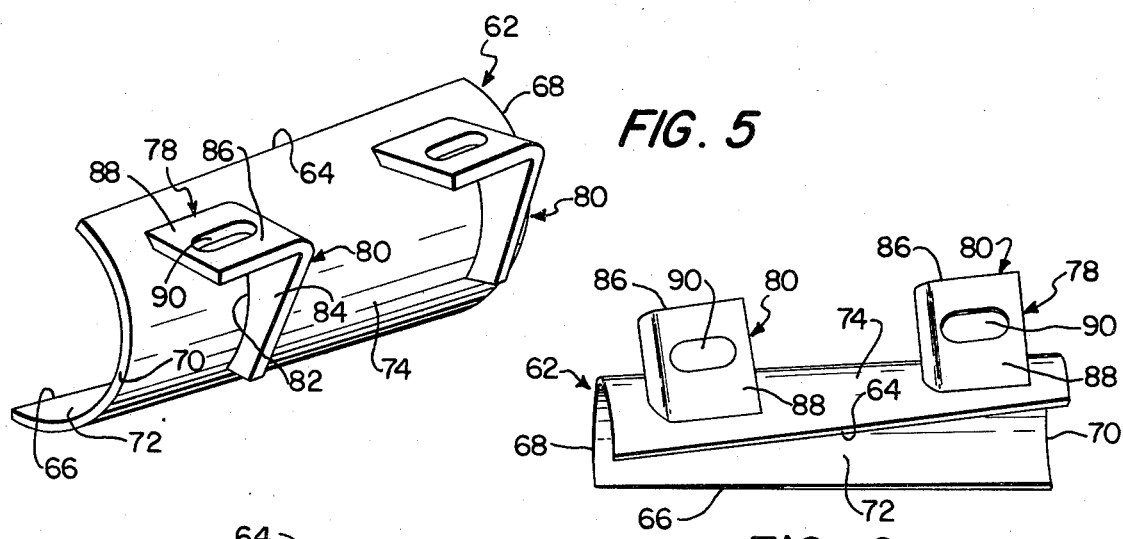
FIG. 5
FIG. 6
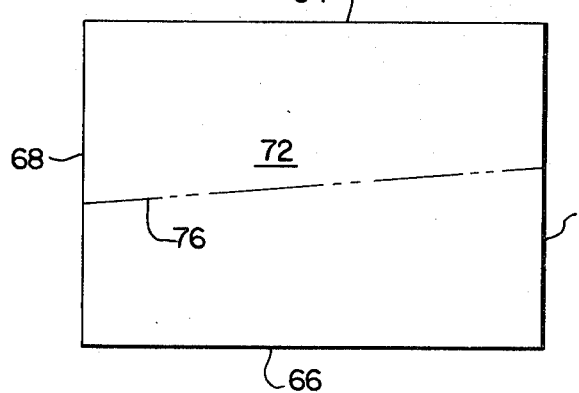
FIG. 7

4,301,647

FORAGE CHOPPING CYLINDER

TECHNICAL FIELD

This invention relates to the harvesting arts and, more particularly, to specific improvements in chopping cylinders used to reduce long stalks of forage materials into relatively short segments for silage.

BACKGROUND ART

Forage chopping cylinders heretofore have been provided with various integral cup-like knives and other structures to assist in propelling crop material that has been severed by the cylinders on around the latter to a point of discharge. However, to our knowledge, nothing has been done in this regard with respect to those choppers which use long, continuous knives twisted into generally helical configurations and approaching their cooperating shearbar at a relatively steep angle so that a scissor-like, slicing or severing action is obtained as opposed to a more blunt, impactive chop.

SUMMARY OF THE PRESENT INVENTION

Accordingly, an important object of the present invention is to provide a way of equipping the scissor-like, steeply inclined knives as aforesaid with flow directors that will control and direct the flow of severed crop material in the desired manner around the periphery of the path of travel of the cylinder during high speed rotation thereof as opposed to permitting the material to enter deeply into the interior of the cylinder as has been past practice, all of which has been found to significantly increase operating efficiency and otherwise improve performance. To this end, each of the knives has a special somewhat cup-like director which is bolted to the radially inner face thereof between adjacent supporting spiders for the knife, it being possible that two or more of such directors will be provided for each knife depending upon the number of supporting spiders employed. Each director is initially constructed from a flat, rectangular pattern and is then formed about a certain axis of curvature to present a front inwardly bowed, crop-engaging surface and a back, outwardly bowed mounting surface. Brackets fixed to the back surface of each director conform to the radius of curvature thereof yet are provided with flat mounting portions that are designed to abuttingly engage the flat inner face of the corresponding knife at a location adjacent one longitudinal edge of the director, thereby permitting the proximal longitudinal edge of the director to be disposed in substantial abutting engagement with the inner face of the knife. This projects the remaining portion of the director radially inwardly of the cylinder while the flat mounting portions of the brackets are securely attached to the knife via threaded couplers in the form of bolts or the like.

BRIEF DESCRIPTION OF THE DRAWINGS

FIG. 5 is a left rear perspective view of one of the directors;

FIG. 6 is a top plan view thereof; and FIG. 7 is a plan view of the flat pattern for one of the directors prior to forming the same into its cupped or partially cylindrical configuration.

DETAILED DESCRIPTION

Figure 1:
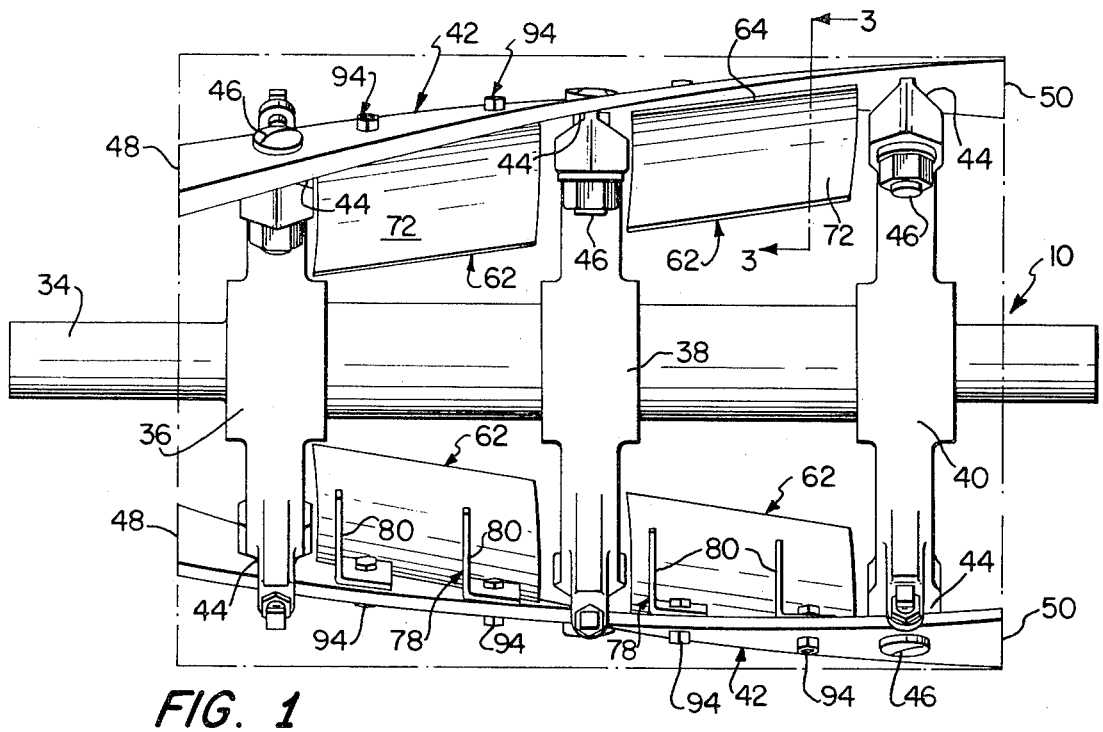
FIG. 1 is a front elevational view of a chopping cylinder constructed in accordance with the principles of the present invention.

FIG. 8 illustrates schematically the environment within which the chopping cylinder according to the present invention is normally to be found. The cylinder 10 is disposed within a housing 12 for rotation in the direction of the arrow 14 in order to cooperate with a shearbar 16 to reduce, chop or sever into segments crop materials entering the housing 12 via the feed opening 18. Feed rolls 20, 22, 24, and 26 are located in upstream relationship to the feed opening 18 in order to propel the stalks of crop material at predetermined speeds into the housing for severance by the cylinder 10, whereupon the crop segments are discharged from the housing 12 through outlet 28 and into a rearwardly disposed fan housing 30 provided with a fan 32 that engages the materials and impels them toward a point of ultimate discharge from the housing 30.

The cylinder 10 itself is provided with a main drive shaft 34 which is journaled in the walls of the housing 12 for rotation about its longitudinal axis, thereby defining the axis of rotation of the cylinder 10. Fixed to the shaft 34 at three spaced locations along the latter are three supporting members or spiders 36, 38, and 40 having radially outermost extremities to which six shearing knives 42 are attached. The specific points 44 of knife attachment of the spiders 36-40 with respect to each individual knife 42 are indexed or rotated into a circumferentially offset pattern to accommodate the generally helical nature of the knives 42. Each of the spiders 36, 38 and 40 is provided with a mounting bolt 46 that securely fastens down the corresponding knife 42 against the respective points of attachment 44.

Each knife 42 is elongated, having a pair of opposite ends 48 and 50, a trailing edge 52, and a leading sharp cutting edge 54. An outer face 56 is located on one side of each knife 42 while an inner face 58 is located on the opposite side thereof, both faces 56,58 being predominantly flat with the exception of the twisted nature of the knife 42 as will be explained below and with the further exception of a bevel 60 on the outer face 56 causing the latter to converge toward the inner face 58 and define the cutting edge 54 along the point of convergence of the two faces 56,58.

Figure 4:
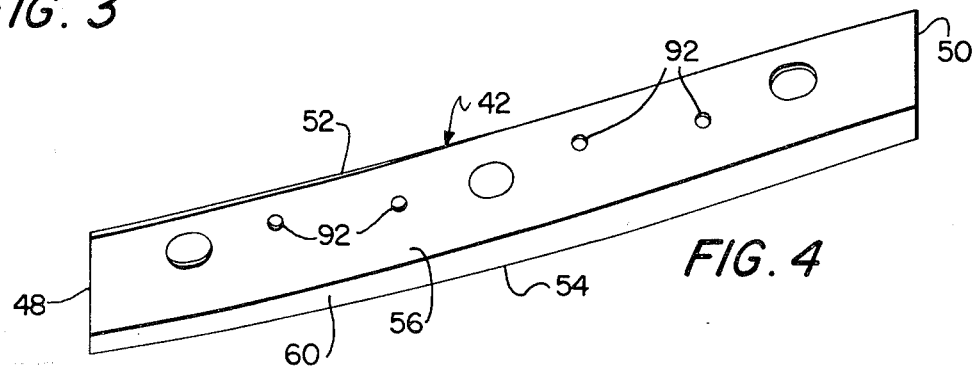
FIG. 4 is a top plan view of one of the knives.

As above eluded to, each of the knives 42 lies across the three spiders 36, 38 and 40 in a diagonally extending manner, and the body of the knife itself is twisted transversely to such an extent that the cutting edge 54 thereof winds in a substantially helical manner around the periphery of the cylinder 10, at least to the extent permitted by the overall length of each knife 42. As will be recognized, this causes points along the cutting edge 54 of each knife 42 to sequentially and progressively sweep past and in cooperation with the shearbar 16 such that the severing action which results is more in the nature of a scissor-like cutting action than in the nature of a blunt chop. Further contributing to this scissoring severance is the relatively steep angle at which the knives approach the shearbar 16 as shown, for example, in FIG. 8. As a result of this steep angle, it is to be understood that the cutting edge 54 cannot be truly parallel with the rear edge 52 and still wind helically around the periphery of the cylinder 10, it instead being necessary for the cutting edge 54 to be slightly bowed outwardly along the central portion thereof in the manner perhaps best illustrated in FIG. 4.

Figure 2:
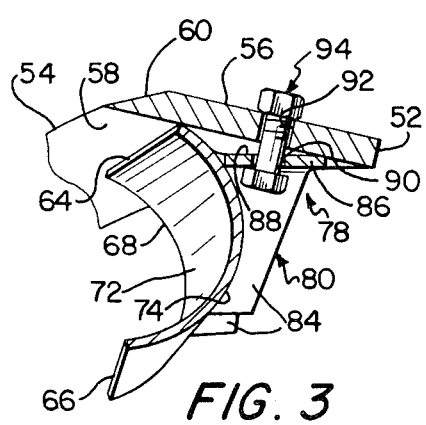
FIG. 2 is an end elevational view of the cylinder but with the supporting spiders for the knives eliminated for purposes of clarity.
Figure 3:
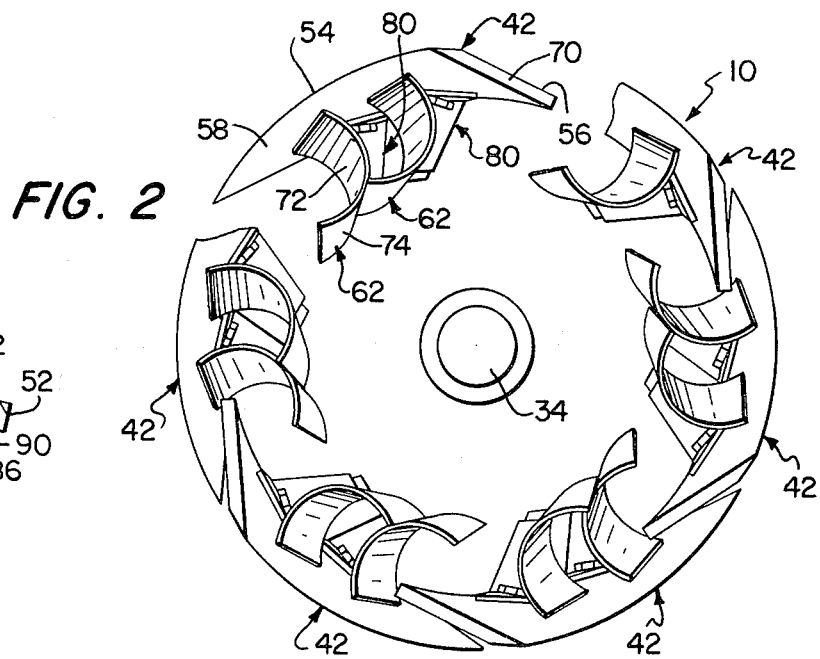
FIG. 3 is an enlarged, fragmentary, transverse, cross-sectional view of one of the knives taken substantially along line 3—3 of FIG. 1.

Pursuant to the present invention, each of the knives 42 is provided with one or more flow directors broadly denoted by the numeral 62 situated between an adjacent pair of the spiders 36, 38 and 40. In the illustrated embodiment, each knife 42 has a pair of the directors 62, one positioned between the spiders 36 and 38, and the other between the spiders 38 and 40. Each director 62 is attached to the knife 42 against the inner face 58 thereof in such a manner as to project substantially radially inwardly from the knife 42, and each is set back with respect to the cutting edge 54 as illustrated most clearly in FIGS. 2 and 3.

Each of the directors 62 comprises an elongated body which is constructed from an initially flat, rectangular pattern as illustrated in FIG. 7. Opposite longitudinal edges 64 and 66 of the body extend between opposite, transversely extending ends 68 and 70, and each body is formed out of its flat pattern about an axis of curvature running longitudinally thereof so that the resulting director 62 becomes provided with an inwardly bowed, partially cylindrical front, crop-engaging surface 72 on one side thereof and with an outwardly bowed, back, mounting surface 74 on the opposite side thereof. As illustrated in FIG. 7, the axis of curvature 76 about which the flat pattern is curved to form each director 62 extends obliquely with respect to the two opposite ends 68, 70 such that the two longitudinal edges 64 and 66 are skewed with respect to one another in the manner illustrated in FIG. 6, notwithstanding the initial rectangular configuration of the flat pattern.

Each director 62 is provided with fastener means broadly denoted by the numeral 78 for attaching the same to the corresponding knife 42. Each of the fastener means 78 includes a pair of brackets 80 of identical construction and of generally inverted, L-shaped configuration when viewed in one edge elevation thereof. Each bracket 80 has an inner portion 82 designed to complementally receive and abuttingly engage the back surface 74 of the director 62 so as to facilitate fixed attachment of the bracket 80 to the back surface 74 via welding or the like. One leg 84 of each bracket 80 extends generally transversely of the longitudinal axis of the director somewhat outboard of a median location thereof, while a second leg 86 extends at an abrupt angle to the leg 84 longitudinally of the director and at a location adjacent to the longitudinal edge 64 thereof. The leg 86 presents a flat portion 88 of the bracket 80 that is adapted to abuttingly engage and lie somewhat generally flatly against the inner face 58 of the corresponding knife 42 as shown perhaps most clearly in FIG. 3.

Both brackets 80 of each director 62 are oriented in the same manner, one to the left of center and one to the right of center, and the flat portion 88 of each is perforated to present a hole 90 situated to be disposed in axial registration with a corresponding perforation in the knife 42, such perforation of knife 42 being in the nature of a hole 92. Each aligned and registered pair of holes 90, 92 receives threaded coupler means in the nature of a bolt and nut assembly 94, and with the flat portions 88 of the brackets 80 projecting outwardly from the bowed back surface 74 in the illustrated manner, the longitudinal edge 64 of each director 62 substantially abuttingly engages the inner face 58 of its knife 42 while its remaining portion projects substantially radially inwardly of the cylinder 10 to control crop flow in the manner discussed below. It will be noted also that as a result of the skewed nature of the edges 64 and 66, the longitudinal axis of each director 62 generally follows the longitudinal axis of knife 42 in its helical disposition about the periphery of the cylinder 10.

As a result of the above construction, the flow of crop materials which would normally head inwardly toward the axial center of the cylinder 10 immediately following severance at the shearbar 16 is prevented from doing so by the directors 62 and is, instead, maintained substantially at the outer periphery of the cylinder 10 during travel around the latter from the inlet 18 to the discharge outlet 28. Performance tests comparing harvesters having cylinders constructed in accordance with the present invention and those having cylinders indentical in all respects to the cylinder 10 but lacking the directors have revealed that the design of the present invention yields greatly improved results insofar as operating efficiency is concerned. This is particularly significant because, heretofore, any forage choppers having flow assisting cups and the like were of substantially more massive design and were provided with either integral cup-shaped blades or with blades which did not slice through the incoming crop material in the clean, scissor-like action obtained by the knives 42 of the cylinder 10. Their blunt, impactive chopping actions instead of clean severance made their designs less desirable from a power requirement standpoint. Thus, the present invention enables the user to obtain not only the desired clean severing action and its many benefits, but also crop flow control and its significant attributes.

We claim:

1. In combination with the knife of a crop material chopping cylinder wherein the knife extends generally longitudinally of the axis of rotation of the cylinder and is provided with an inner face, an outer face, and a leading cutting edge at the convergence of said faces, a crop material flow-controlling director comprising:
   an elongated, non-severing body having a normally front, crop-engaging surface on one side thereof and extending between the opposite ends of the body, a normally back surface on the opposite side thereof and extending between said opposite ends of the body, a normally outer, longitudinal margin engaging said inner face of the knife, and an inner, longitudinal margin spaced away from said inner face of the knife; and
   fastener means on one of said surfaces adjacent said outer, knife-engaging margin thereof attaching the body to the knife.

2. The combination as claimed in claim 1, wherein said fastener means includes bracket means affixed to said back surface and threaded coupler means for joining the bracket means with the knife.

3. A crop material flow-controlling director attachable to the knife of a crop material chopping cylinder wherein the knife extends generally longitudinally of the axis of rotation of the cylinder and is provided with an inner face, an outer face, and a leading cutting edge at the convergence of said faces, said director comprising:

an elongated, non-severing body having a normally front, crop-engaging surface on one side thereof and extending between the opposite ends of the body, said body further having a normally back, mounting surface on the opposite side thereof and extending between said opposite ends of the body; and fastener means on said back surface of the body rendering the latter attachable to said knife against said inner face thereof, said fastener means including bracket means affixed to said back surface and threaded coupler means for joining the bracket means with the knife, said back surface of the body being outwardly bowed in a direction transverse to the longitudinal axis of the body, said bracket means including a body-abutting portion configured to complementally receive said outwardly bowed back surface of the body, said bracket means further including a generally flat knife-abutting portion configured to lie generally flatly against said inner face of the knife.

4. A crop material flow-controlling director as claimed in claim 3, wherein said knife-abutting portion of the bracket means is perforated to receive said threaded coupler means.

5. A crop material flow-controlling director as claimed in claim 3, wherein said body is formed from an initially flat, rectangular pattern into a partially cylindrical configuration to present said front and back surfaces.

6. A crop material flow-controlling director as claimed in claim 5, wherein said body is bowed about an axis extending obliquely with respect to the opposite ends of the body so as to render opposite longitudinal edges of the body skewed with respect to one another.

7. A crop material chopping cylinder comprising:
a shaft defining the axis of rotation of the cylinder;
a plurality of support members attached to the shaft at spaced locations along the latter and having respective radially outwardly disposed extremities;
a plurality of elongated, continuous knives extending generally longitudinally of the shaft at said outer extremities of the members and securely attached thereto for rotation with the shaft and the members about said axis,
each of said knives extending continuously substantially from one end to the opposite end of the cylinder, and having an inner face, an outer face, and a leading crop-cutting edge at the convergence of said faces,
said cutting edge of each knife winding generally helically around the cylinder;
a plurality of crop-flow controlling directors, each having an inwardly bowed crop-engaging front surface; and
fastener means attaching at least one of said directors to said inner face of each of said knives between an adjacent pair of said members in disposition to encourage the flow of crop severed by the cylinder during rotation thereof to be carried peripherally of the cylinder during its movement around and with the latter.

8. A crop material chopping cylinder as claimed in claim 7, wherein each of said directors is provided with a back surface opposite said front surface thereof, said fastener means including bracket means fixed to said back surface and threaded coupler means connecting said bracket means to its knife.

9. A crop material chopping cylinder as claimed in claim 7, wherein each of said directors is constructed from an initially flat pattern formed about a certain axis of curvature to present opposite generally concave and convex sides corresponding respectively to said front surface and a back surface of the director.

10. A crop material chopping cylinder as claimed in claim 9, wherein each of said directors has a first marginal longitudinal edge thereof in substantial abutting engagement with said inner face of the corresponding knife while an opposite longitudinal edge thereof is spaced from said inner face in a generally radially inboard direction with respect to the axis of rotation of the cylinder, said fastener means including a generally flat portion adjacent said first edge of the director and projecting from said back surface of the director into generally flat, abutting engagement with said inner face of the knife for attachment thereto.

11. A crop material chopping cylinder as claimed in claim 10, wherein said flat portion of the bracket means and the corresponding knife are provided with aligned perforations therethrough, said fastener means further including threaded coupler means extending through said perforations.

12. A crop material chopping cylinder as claimed in claim 9, wherein each director is rectangular in said flat pattern but is formed about an axis extending obliquely with respect to opposite ends of the director so as to render opposite longitudinal edges that extend between said ends skewed with respect to one another, said oblique axis generally following the longitudinal axis of the knife to which the director is attached.

13. The combination as claimed in claim 1, wherein said front surface is inwardly bowed.

* * * * *